(12) United States Patent
Liao

(10) Patent No.: US 7,329,357 B2
(45) Date of Patent: Feb. 12, 2008

(54) METHOD FOR REMOVING FLUORINE FROM A FLUORINE-CONTAINING WASTEWATER

(76) Inventor: Ming-Hui Liao, No. 18, Lane 67, Chih-Chiang 2nd Rd., Chien-Chin Dist., Kaohsiung City (TW)

(*) Notice: Subject to any disclaimer, the term of this patent is extended or adjusted under 35 U.S.C. 154(b) by 229 days.

(21) Appl. No.: 11/142,874

(22) Filed: May 31, 2005

(65) Prior Publication Data

US 2006/0266711 A1  Nov. 30, 2006

(51) Int. Cl.
- C02F 1/58 (2006.01)
- C02F 1/62 (2006.01)
- C02F 101/14 (2006.01)
- C02F 101/20 (2006.01)

(52) U.S. Cl. ............ 210/724; 210/726; 210/912; 210/913; 210/915

(58) Field of Classification Search ............ 210/915
See application file for complete search history.

(56) References Cited

U.S. PATENT DOCUMENTS

| | | | | | |
|---|---|---|---|---|---|
| 2,531,451 | A | * | 11/1950 | Maier | 210/667 |
| 4,159,246 | A | * | 6/1979 | Matsumoto | 205/756 |
| 5,240,600 | A | * | 8/1993 | Wang et al. | 210/188 |
| 5,750,033 | A | * | 5/1998 | Ikeda et al. | 210/711 |
| 5,824,227 | A | * | 10/1998 | Cargnel et al. | 210/713 |
| 6,235,203 | B1 | * | 5/2001 | Lee et al. | 210/711 |

FOREIGN PATENT DOCUMENTS

CA     1332118 A  *  1/2002

* cited by examiner

*Primary Examiner*—Peter A. Hruskoci
(74) *Attorney, Agent, or Firm*—Christensen O'Connor Johnson Kindness PLLC

(57) ABSTRACT

A method for removing fluorine from wastewater includes the steps of: adding a fluorine-reactive agent, that comprises a water-soluble sodium compound and a water-soluble aluminum compound, into the wastewater so as to form sodium ions and aluminum ions in the wastewater and so as to precipitate sodium aluminum fluoride by reaction of the sodium ions and the aluminum ions with fluorine ions in the wastewater; and removing the precipitate of sodium aluminum fluoride from the wastewater.

4 Claims, No Drawings

METHOD FOR REMOVING FLUORINE FROM A FLUORINE-CONTAINING WASTEWATER

BACKGROUND OF THE INVENTION

1. Field of the Invention

This invention relates to a method for removing fluorine from fluorine-containing wastewater, more particularly to a method for removing fluorine from fluorine-containing wastewater using a fluorine-reactive agent that can react with fluorine ions so as to form sodium aluminum fluoride.

2. Description of the Related Art

Conventional wastewater treatment for fluorine removal involves addition of a fluorine-reactive agent, such as CaO, $Ca(OH)_2$, $CaCl_2$, into the wastewater and reaction of the fluorine-reactive agent with fluorine ions in the wastewater to form $CaF_2$ precipitate, which is subsequently removed from the wastewater.

The conventional treatment method is disadvantageous in that addition of powdered CaO or $Ca(OH)_2$ into the wastewater tends to release dust into the environment during operation, which is harmful to operators. In addition, the solubility of the powdered CaO or $Ca(OH)_2$ is relatively low. As such, an excessive amount of the powdered CaO or $Ca(OH)_2$ is required. Moreover, $Ca(OH)_2$ precipitate is also formed during precipitation of CaF2 in the wastewater. As a consequence, a large portion of the cake thus formed contains undesired water and $Ca(OH)_2$, which cannot be recycled.

SUMMARY OF THE INVENTION

The object of the present invention is to provide a method for removing fluorine from wastewater using a fluorine-reactive agent that can react with fluorine ions so as to form sodium aluminum fluoride and that is capable of overcoming at least one of the aforesaid drawbacks of the conventional method.

According to the present invention, a method for removing fluorine from wastewater comprises the steps of: adding a fluorine-reactive agent, that comprises a water-soluble sodium compound and a water-soluble aluminum compound, into the wastewater so as to form sodium ions and aluminum ions in the wastewater and so as to precipitate sodium aluminum fluoride by reaction of the sodium ions and the aluminum ions with fluorine ions in the wastewater; and removing the precipitate of sodium aluminum fluoride from the wastewater.

DETAILED DESCRIPTION OF THE PREFERRED EMBODIMENT

The preferred embodiment of a method of this invention for removing fluorine from wastewater includes the steps of: adding a fluorine-reactive agent, that comprises a water-soluble sodium compound and a water-soluble aluminum compound, into the wastewater so as to form sodium ions and aluminum ions in the wastewater and so as to precipitate sodium aluminum fluoride by reaction of the sodium ions and the aluminum ions with fluorine ions in the wastewater; and removing the precipitate of sodium aluminum fluoride from the wastewater. In this embodiment, the pH value of the wastewater is controlled to be within a range ranging from 6 to 10 during precipitation of the sodium aluminum fluoride.

Preferably, the sodium compound is selected from the group consisting of $Na_2CO_3$, $NaHCO_3$, NaOH, NaCl, and combinations thereof.

Preferably, the aluminum compound is selected from the group consisting of $AlCl_3$, $Al(OH)_3$, $Na_2Al_2O_4$, $Al_2(SO_4)_3$, $Na_2O.Al_2O_3$, $NaAlO_2$, $NaAl(OH)_4$, $Al_2O_3$, and combinations thereof.

Since the sodium compound and the aluminum compound are water-soluble, the aforesaid drawbacks associated with poor solubility of the conventional fluorine-reactive agent, i.e., powdered CaO or $Ca(OH)_2$, can be eliminated.

Preferably, the molar ratio of the concentration of the sodium ions to the concentration of the aluminum ions in the wastewater for reacting with the fluorine ions ranges from 1 to 10. More preferably, the molar ratio of the concentration of the sodium ions to the concentration of the aluminum ions in the wastewater is 3 so that the precipitate of sodium aluminum fluoride has a formula of $Na_3AlF_6$, which can be recycled and reused upon removal from the wastewater.

Preferably, the method further includes the steps of: settling the wastewater prior to the addition of the fluorine-reactive agent for settling heavy suspended solids and for permitting floating of light suspended solids on the surface of the wastewater; subsequently removing the heavy and light suspended solids from the wastewater; removing metal ions in the wastewater after removal of the heavy and light suspended solids and prior to the addition of the fluorine-reactive agent by adjusting the pH value of the wastewater by adding a pH-adjusting agent into the wastewater in an amount such that the pH value of the wastewater ranges from 6 to 10 so as to precipitate metal hydroxides through reaction of the metal ions with hydroxide ions in the wastewater; and filtering the wastewater to remove the precipitate of the metal hydroxides from the wastewater. The metal ions present in the wastewater in the preferred embodiment include $Cu^{2+}$, $Cu^+$, $Co^+$, $Co^{2+}$, $Co^{3+}$, $Cr^{3+}$, $Cr^{6+}$, $Fe^{2+}$, $Fe^{3+}$, $Ni^+$, $Ni2^+$, $Ni^{3+}$, $Ca^{2+}$, $Mg^{2+}$, and $Si^{4+}$. Removal of the metal ions from the wastewater can prevent interference on the precipitation of the fluorine ions in the wastewater.

Preferably, when the wastewater is acidic and has a pH value less than 6, the pH-adjusting agent is a compound selected from the group consisting of NaOH, $Na_2CO_3$, $NaHCO_3$, $NaAlO_2$, $NaAl(OH)_4$, and combinations thereof, when the wastewater is alkaline and has a pH value greater than 10, the pH-adjusting agent is a compound selected from the group consisting of HCl, poly aluminum chloride, $AlCl_3$, $Al_2(SO_4)_3$, $Na_2CO_3$, $NaHCO_3$, and combinations thereof, and when the wastewater is neutral and has a pH value ranging from 6 to 10, the pH-adjusting agent is a compound selected from the group consisting of NaCl, $AlCl_3$, $Al_2(SO_4)_3$, $Na_2CO_3$, $NaHCO_3$, $NaAlO_2$, $NaAl(OH)_4$, and combinations thereof.

EXAMPLE

This invention will now be described in greater detail with reference to the following Example.

Example 1

A body of the fluorine-containing wastewater, which had a pH value of about 3 and which contained about 3000 ppm of fluorine, was stored in a tank, and was settled for removing the heavy and light suspended solids from the wastewater. A mixture of NaOH and $NaAlO_2$ (with a molar ratio of 3:1 in the wastewater) employed as the fluorine-reactive agent was added into the wastewater to form the precipitate of $Na_3AlF_6$. Note that the added NaOH also serves as the pH-adjusting agent in this Example. The wastewater was subsequently filtered, and was analyzed. Results show that the treated wastewater had a pH value of about 7, and contained about 300 ppm fluorine.

By using the fluorine-reactive agent according to this invention, removal of fluorine from the wastewater can be very effective and the aforesaid drawbacks associated with the prior art can be eliminated.

With the invention thus explained, it is apparent that various modifications and variations can be made without departing from the spirit of the present invention. It is therefore intended that the invention be limited only as recited in the appended claims.

I claim:

1. A method for removing fluorine from wastewater, comprising:

settling wastewater for settling heavy suspended solids and for permitting floating of light suspended solids on the surface of the wastewater, and subsequently removing the heavy and light suspended solids;

removing metal ions in the wastewater by adjusting the pH value of the wastewater by adding a pH-adjusting agent into the wastewater in an amount such that the pH value of the wastewater ranges from 6 to 10 so as to precipitate metal hydroxides through reaction of the metal ions with hydroxide ions in the wastewater, and filtering the wastewater to remove the precipitate of the metal hydroxides from the wastewater;

adding a fluorine reactive agent $NaAlO_2$ into the wastewater so as to form sodium ions and aluminum ions in the wastewater and so as to precipitate sodium aluminum fluoride by reaction of the sodium ions and the aluminum ions with fluorine ions in the wastewater; and removing the precipitate of sodium aluminum fluoride from the wastewater, wherein the precipitate of sodium aluminum fluoride has a formula of $Na_3AlF_6$.

2. The method of claim 1, wherein when the wastewater is acidic and has a pH value less than 6, the pH-adjusting agent is a compound selected from the group consisting of NaOH, $Na_2CO_3$, $NaHCO_3$, NaAlO2, $NaAl(OH)_4$, and combinations thereof.

3. The method of claim 1, wherein when the wastewater is alkaline and has a pH value greater than 10, the pH-adjusting agent is a compound selected from the group consisting of HCl, poly aluminum chloride, $AlCl_3$, $Al_2(SO_4)_3$, $Na_2CO_3$, $NaHCO_3$, and combinations thereof.

4. The method of claim 1, wherein when the wastewater is neutral and has a pH value ranging from 6 to 10, the pH-adjusting agent is a compound selected from the group consisting of NaCl, $AlCl_3$, $Al_2(SO_4)_3$, $Na_2CO_3$, $NaHCO_3$, $NaAlO_2$, $NaAl(OH)_4$, and combinations thereof.

* * * * *